United States Patent [19]
Bailey et al.

[11] Patent Number: 5,651,931
[45] Date of Patent: Jul. 29, 1997

[54] METHOD OF MAKING A BIOCOMPATIBLE FILTER

[75] Inventors: Michael L. Bailey, Oak Harbor, Wash.;
Rajkumar Raman, Arlington, Va.;
Randall M. German, State College, Pa.

[73] Assignee: Upchurch Scientific, Inc., Oak Harbor, Wash.

[21] Appl. No.: 581,301

[22] Filed: Dec. 28, 1995

Related U.S. Application Data

[63] Continuation of Ser. No. 188,190, Jan. 27, 1994, abandoned.

[51] Int. Cl.$^6$ .................................................. B29C 43/02
[52] U.S. Cl. ........................ 264/126; 264/299; 210/510.1; 210/500.27; 210/500.28
[58] Field of Search .................................. 284/122, 123, 284/125, 126; 210/299, 500.27, 500.28, 586, 510.1, 767

[56] References Cited

U.S. PATENT DOCUMENTS

| | | | |
|---|---|---|---|
| 3,671,615 | 6/1972 | Price | 264/122 |
| 4,874,568 | 10/1989 | Chau et al. | 264/126 |
| 4,925,880 | 5/1990 | Stein | 210/500.28 |
| 4,966,696 | 10/1990 | Allington et al. | 210/198.2 |
| 5,064,580 | 11/1991 | Beck et al. | 210/500.28 |
| 5,167,889 | 12/1992 | Alvarez et al. | 254/126 |
| 5,213,889 | 5/1993 | Cogswell et al. | 428/332 |
| 5,366,620 | 11/1994 | Schick | 210/198.2 |
| 5,534,152 | 7/1996 | Schick | 210/767 |

OTHER PUBLICATIONS

1992 *Upchurch Scientific* catalog, pp. 114–116, published in the U.S.A.
1991 *Alltech* catalog, pp. 604–605, published by Altech in the U.S.A. Catalog 250.
1993 *Alltech* catalog, pp. 670–672, published by Altech in the U.S.A. Catalog 300.
1990 *Victrex Peek* brochure, p. 46, published by ICI in the U.S.A.
Dr. Randall M. German, *Porous Materials*, presented at 1981 ASM Materials Science Seminar, Louisville, Kentucky, U.S.A.
L.R. Snyder & J. J. Kirland, *Introduction to Modern Liquid Chromatography* (2d ed. 1979), chapters 2, 4, & 5.
1993 *Upchurch Scientific* catalog, pp. 114–116, published in the U.S.A.

*Primary Examiner*—David A. Reifsnyder
*Attorney, Agent, or Firm*—Vinson & Elkins, L.L.P.

[57] ABSTRACT

A method for making a biocompatible filter whereby a biocompatible powder is sintered to form a disk-shaped filter. The biocompatible powder is first sized to obtain a preselected average particle size. Next, the powder is introduced to a die in which the powder is pressed to a predetermined force to form "cakes." The pressed powder "cakes" are then placed into an oven or furnace, which is heated to a preselected temperature. The powder cakes are held at the elevated temperature to sinter the particles in the powder together. After a preselected amount of time, the now-sintered powder cakes are removed and allowed to cool. This method produces biocompatible filters useful in liquid chromatography and other applications.

19 Claims, 3 Drawing Sheets

METHOD OF MAKING A BIOCOMPATIBLE FILTER

This application is a continuation of application Ser. No. 08/188,190, filed Jan. 27, 1994, now abandoned.

FIELD OF THE INVENTION

This invention relates generally to a method for making a biocompatible filter useful in liquid chromatography and other applications.

BACKGROUND OF THE INVENTION

Liquid chromatography (LC) is a well-known technique for separating the constituent elements in a given sample. A typical liquid LC system has a sophisticated plumbing system utilizing tubing to transfer fluid between the various components of the LC system. Various fittings are used to connect the tubing to these components. Many different types of LC systems and components for LC systems are commercially available from a number of vendors. For example, Millipore Corporation of Milford, Mass., Beckman Instruments of Fullerton, California, and Hewlett-Packard Company of Palo Alto, Calif., all sell LC systems, including pumps, sample injection valves, columns, and detectors, among other things.

In a typical LC system, a liquid solvent (often called the "mobile phase") is introduced from a solvent reservoir and delivered via tubing to the pump. In operation, the pump creates a vacuum which draws the solvent through the tubing and into the pump. The solvent exits the pump under a higher pressure and then passes to the sample injection vane. As the name suggests, the sample injection vane allows an operator to inject a sample into the LC system, where the sample will be carried along with the mobile phase.

After the sample injection valve, most LC systems include a column. A typical column usually consists of a piece of steel tubing which has been packed with a "packing" material. The "packing" consists of the particulate material inside the column. This material is usually made of silica- or polymer-based particles, which are often chemically bonded with a chemical function. When the sample is carried through the column (along with the mobile phase), the various components (solutes) in the sample migrate through the packing within the column at different rates (i.e., there is differential migration of the solutes). Because of the different rates of movement, the components gradually separate as they move through the column. A more detailed description of the separation process can be found, among other places, in Chapters 2 and 5 of *Introduction to Modern Liquid Chromatography* (2d ed. 1979) by L. R. Snyder and J. J. Kirkland, which chapters are incorporated by reference herein.

Once the sample (with its components now separated) leaves the column, it flows with the mobile phase past a detector. The detector detects the presence of specific molecules or compounds. As discussed in Chapter 4 of *Introduction to Modern Liquid Chromatography*, which chapter is incorporated by reference herein, two general types of detectors are used in LC applications. One type measures a change in some overall physical property of the mobile phase and the sample (such as their refractive index). The other type measures only some property of the sample (such as the absorption of ultraviolet radiation). In essence, a typical detector in an LC system can measure and provide an output in terms of mass per unit of volume (such as grams per milliliter) or mass per unit of time (such as grams per second) of the sample's components. From such an output signal, a "chromatograph" can be provided; the chromatograph can then be used by an operator to determine the chemical components present in the sample. It will be understood to those skilled in the art that, as used herein, the term "LC system" is intended in its broad sense to include all apparatus used in connection with liquid chromatography, whether made of only a few simple components or made of numerous, sophisticated components which are computer controlled or the like.

In addition to the above components, many LC systems will include various filters, check vanes, or the like in order to prevent contamination of the sample or damage to the LC system. Often, liquid chromatography is performed with a limited amount of a given sample or an extremely expensive sample. An operator cannot afford to replicate tests at will in such situations. In addition, an operator often needs to examine extremely minute amounts of chemicals; in these situations, any contamination can potentially ruin the test. Moreover, various components of the LC system can be quite expensive. Hence, filters are used are various stages in the LC system to prevent contamination and also to protect the LC system components from wear and tear.

Most pumps used in the LC systems which are commercially available can generate relatively high pressures of up to around 10,000 to 15,000 psi. In many situations, an operator can obtain successful results by operating an LC system at low pressures of anywhere from just a few psi or so up to 1,000 psi or so. In other situations, however, an operator will find it desirable to operate an LC system at relatively "higher" pressures of over 1,000 psi. The operation and use of LC systems at such "higher" pressure levels is often referred to as "high pressure liquid chromatography" or "high performance liquid chromatography" (HPLC). In order to be suitable for HPLC applications, an LC component must be made to withstand the required pressures. Otherwise, the component may fail, thus potentially causing personal injury, the loss of valuable materials and research efforts, and the like. For these and other reasons, many components and fittings used in HPLC are made of stainless steel.

More recently, it has been realized that the use of stainless steel (and other metals) in the components of an LC system which come in contact with the mobile phase create potential drawbacks when dealing with biological samples. For example, the ions in a sample may attach themselves to the stainless steel material if the mobile phase comes in contact with the stainless steel. Similarly, ions from the metal components may detach and eventually flow past the detector, thus leading to potentially erroneous results. Hence, those portions of the LC components which come in contact with the mobile phase need to be biocompatible (i.e., chemically inert with respect to biological samples and the mobile phase carrying these samples) in many applications involving biological samples. Simply put, there is a need for biocompatible components of LC systems.

In the past, many filters for high pressure LC applications were made of metal or otherwise had metallic parts which contacted the mobile phase. For example, stainless steel and titanium filters have been used. Conventional metallic filters have been made via sintering, such as is described in U.S. Pat. No. 4,966,696, which is hereby incorporated by reference. However, such metallic filters are not biocompatible.

On the other hand, those few filters which were made of biocompatible materials (such as ultra-high molecular weight polyethylene) were made of plastic materials that could only be used with a limited number of the solvents often used as the mobile phase in many HPLC applications. For example, a "biocompatible" filter made of polyetheretherketone (PEEK) and polytetrafluoroethylene (PTFE) is commercially available from Alltech Associates, Inc. Because polytetrafluoroethylene chemically reacts with a number of mobile phases that are commonly used, however, such filters cannot be used in many LC applications. In addition, the polytetrafluoroethylene is not very strong and wears quickly. When such a filter wears down, pieces of the filter break off, thereby leading to the risk of damage of other components of the LC system and contamination of the sample to be studied. Hence, such conventional filters cannot be used in many HPLC applications. As a result, there is a need for a filter which is biocompatible and which can be used in relatively high pressure applications with a variety of mobile phases without leaking or otherwise failing.

SUMMARY OF THE INVENTION

The present invention provides a method for making a biocompatible filter, as would be especially useful in LC applications. According to the invention, a biocompatible powder with a desired average particle size is placed in a die and press apparatus and is then pressed to form a "cake" of the biocompatible powder. The cake is then heated to a preselected temperature, which is maintained for a predetermined amount of time. By heating the biocompatible powder cake for the appropriate amount of time at the appropriate temperature, the biocompatible powder is sintered so that the particles of the powder bond together to form a biocompatible filter. The resulting biocompatible filter is removed from the heating apparatus after the preselected time period has elapsed and is then allowed to cool.

Accordingly, it is an object of the present invention is to provide a method for making an efficient, effective and inexpensive filter for use in liquid chromatography and other applications.

It is another object of the present invention to provide a method for making a filter that is biocompatible.

It is another object of the present invention to provide a method for making a biocompatible filter which can be used at relatively higher pressures of around 6,000 psi in a liquid chromatography system or in other applications.

It is another object of the present invention to provide a method for making a biocompatible filter which can be used with a wide variety of solvents commonly used in a liquid chromatography system.

It is another object of the present invention to provide a method for making a biocompatible filter which consists entirely of polyetherehterketone and not other materials which could chemically react with commonly used solvents and thereby break apart and contaminate a liquid chromatography system.

The above and other advantages of the present invention will become readily apparent to those skilled in the art from the following detailed description of the present invention, and from the attached drawings, which are briefly described below.

DESCRIPTION OF THE PREFERRED EMBODIMENT

Figure 1:
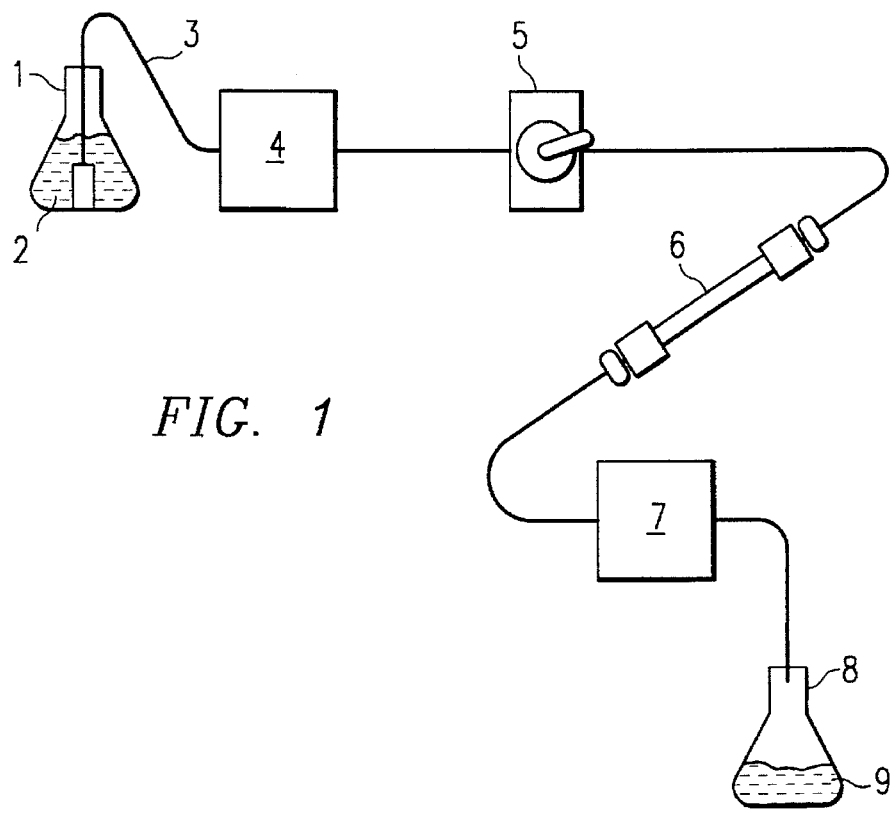
FIG. 1 is a schematic diagram of the typical components in an LC system.

In FIG. 1, a block diagram illustrating the typical environment in which the present invention will be utilized is provided, with the basic and essential elements of an LC system shown. A reservoir 1 contains a solvent or mobile phase 2. Tubing 3 connects the mobile phase 2 in the reservoir 1 to a pump 4. The pump 4 is connected via tubing to a sample injection valve 5 which, in turn, is connected via tubing to a first end of a column 6. The second end of the column 6 is then connected via tubing to a detector 7. After passing through the detector 7, the mobile phase 2 and the sample injected via injection valve 5 are transported via tubing into a second reservoir 8, which contains the chemical waste 9. Data from the detector 7 can be relayed to a recording device 10 which can generate a paper printout of the information obtained by the detector 7. As noted above, the sample injection valve 5 is used to inject a sample of a material to be studied into the LC system. In operation, the mobile phase 2 flows through the tubing 3, which is used to connect the various elements of the LC system together.

When the sample is injected via sample injection valve 5 in the LC system, the sample is carried by the mobile phase through the tubing into the column 6. As is well known in the art, the column 6 contains a packing material which acts to separate the constituent elements of the sample. After exiting the column 6, the sample (as separated via the column 6) then is carried to and enters a detector 7, which detects the presence or absence of various ions. The information obtained by the detector 7 can then be stored by well-known means (such as a personal computer programmed to do so) and used by an operator of the LC system to determine the constituent elements of the sample injected into the LC system.

Various filters are typically used in LC systems. The following description of a method for forming a biocompatible filter in accordance with the invention is directed towards a thin, disk-shaped filter, commonly referred to as a "frit." It will be understood by those skilled in the art, however, that the method of the present invention can be used to form biocompatible filters of shapes and sizes other than those described herein, such as solvent inlet filters. Similarly, those skilled in the art will recognize that, although the following discussion addresses LC applications, biocompatible filters can be used in many commercial, industrial, and other processes in which a liquid is to be filtered.

For best results, we prefer to use polyetheretherketone (PEEK) as the biocompatible material. PEEK of various grades is commercially available from ICI America. Although PEEK can be difficult to use from a manufacturing standpoint, it has the advantage of strength and is chemically inert to most solvents used as the mobile phase in LC applications. PEEK is commercially available in pellet and powder form. To be useful in accordance with the present invention, a powder is needed. We have found that the particular size of the powder is a crucial factor in obtaining and controlling the desired filtering characteristics of the filter to be made in accordance with the present invention.

The following discussion addresses the question of obtaining a powder with a desired average particle size. Once purchased, PEEK pellets can be ground by conventional techniques to form a fine powder. The powder can be screened by a conventional mesh screen or can be sized by a conventional air classifier (not shown) to provide a powder with particles of a desired size in order to obtain a filter with the desired filtering characteristics. For a 2 μm filter, for example, we prefer an average particle size of 90 μm. A mesh screen (of size 60) can be used to obtain a PEEK powder with a maximum particle size of less than 45 μm. The PEEK powder can be sifted by conventional means. For example, a Ro-Tap and screens with mesh numbers 60 and 170 can be used for sifting the PEEK powder in connection with making a 2 μm flit. Typically, the PEEK powder is sifted through all of the screens (depending upon the size of the desired frit) for approximately twenty to thirty minutes or so, or until all of the PEEK powder has passed through all of the relevant screens. The Ro-Tap and mesh screens are commercially available from Tyler Manufacturing of Mentor, Ohio.

Figure 2:
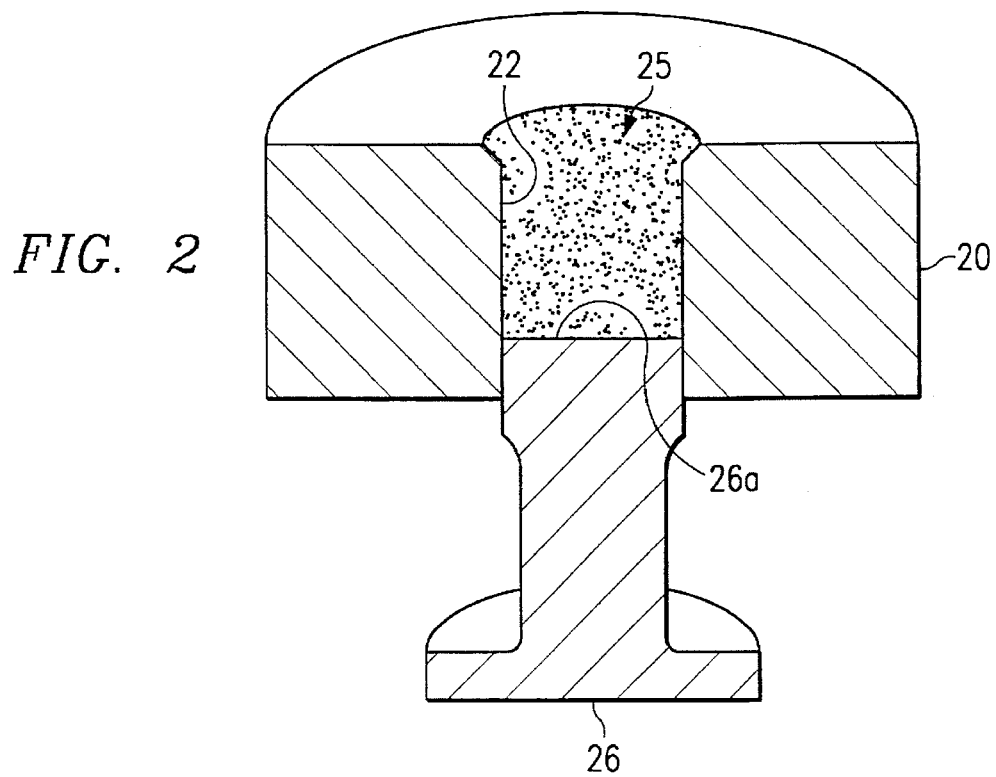
FIG. 2 is a cross-sectional view of the bottom portion of a die and press used in accordance with the present invention.

Once the PEEK powder has been sized (such as by screening or air classifying), the powder needs to be pressed. Referring now to FIG. 2, an appropriate amount of the powder 25 is introduced into a die 20. As shown in FIG. 2, die 20 has a central bore 22 running therethrough. A lower press 26 has a facing section 26a. (It will be understood that a die 20 with a plurality of bores could be used. For convenience, the Figures and the following discussion assume that a single filter is made via a die 20 with a single bore 22.) When the die 20 is in a loading position (as shown in FIG. 2), the facing section 26a extends into the bottom portion of the bore 22 of die 20. The power press 26 is partially inserted into the bore 22 of die 20. The lower press 26 is positioned so that the distance between the top of the facing section 26a and the top of the die 20 is equal to the "fill height," as determined in accordance with the following description.

In order to obtain a filter of the desired shape and size, an appropriate amount of the PEEK powder needs to be placed into the bore 22 of the die 20. The proper amount of PEEK powder can be determined by calculating the appropriate fill height ($h_f$) in accordance with the following formula:

$h_f = [(thick_f \div (1 + \% \Delta \text{ from sintering})) \times (\delta p / F_p)]$ where
 $thick_f$ = desired final thickness of Frit,
 $\delta p$ = pressed theoretical density %, and
 $F_p$ = packing fraction.

An alternative method for obtaining the approximate amount of the PEEK powder is to weigh the PEEK powder that goes into the bore 22. Through experimentation, we have found that the pressed theoretical density % ($\delta p$) of PEEK is 0.85. In addition, the packing fraction ($F_p$) represents the ratio of the apparent density to the theoretical density of the material (i.e., $F_p = \delta_a / \delta_{th}$).

The apparent density ($\delta_a$) of the PEEK varies and should be determined after the powder is sifted. In the specific example described herein, the apparent density ($\delta_a$) was determined to be 0.394 g/cm³ after the PEEK powder was sifted in accordance with the procedure described above. Because the theoretical density ($\delta_{th}$) of the PEEK powder is 1.32 g/cm³, the packing fraction ($F_p$) for this specific example is 0.2985.

In our specific example, the fill height for a filter 0.075" thick can be calculated as follows:

$h_f = [(0.075" \div (1+0.20)) \times (0.85/0.2985)]$, which can be simplified to $h_f = (0.075" + 1.20) \times (2.8476)$, or $h_f = 0.178"$.

Once the desired fill height ($h_f$) has been determined in accordance with the above procedure, an operator can position the lower press 26 so that the distance from the facing section 26a to the top of the die 20 equals the predetermined fill height. Alternatively, the die 20 can be machined to accommodate the fill height. Once the lower press 26 has been positioned to provide the desired fill height, an operator can simply pour enough PEEK powder 26 into the bore 22 of the die 20 to fill the bore 22 to the desired fill height ($h_f$). If needed, the operator can remove any excess PEEK powder 25 from the die 20 by scraping it away or can add additional PEEK powder 25 and check again until the desired fill height ($h_f$) is achieved.

Figure 3:
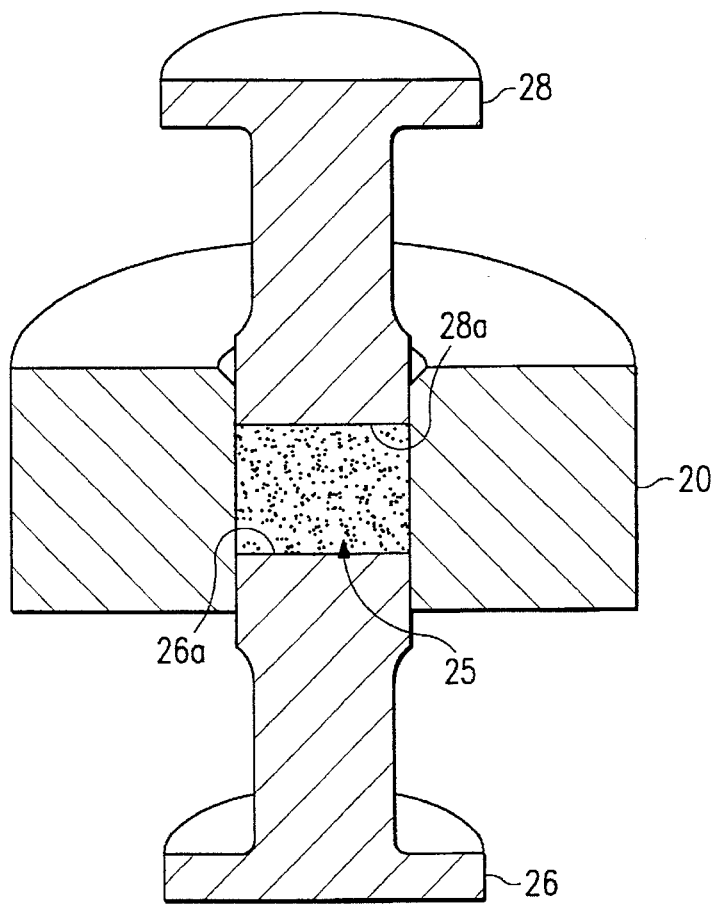
FIG. 3 is a cross-sectional view of the die and press of FIG. 2, except that FIG. 3 shows the die and press in a closed position.

Once the correct, predetermined amount of PEEK powder has been placed in the bore 22 of the die 20, an upper press 28 is lowered. As shown in FIG. 3, the facing section 28a of the upper press 28 extends into the bore 22 of the die 20. When closed, the upper facing section 28a is pressed downwards by a conventional press apparatus (not shown). This exerts a compaction force on the PEEK powder 25. For best results, we prefer a compaction force of approximately 200 MPa for each frit. This force should be uniform over the surface area of each frit. This pressing operation can last anywhere from a few milliseconds to several minutes.

After the PEEK powder 25 has been pressed, the upper press 28 is first raised. The lower press 26 is then pushed further into and through the bore 22 of the die 20. Thus, the lower press 26 pushes the pressed PEEK powder 25 out of the die 20. We have found that the pressing operation essentially forms "cakes" of the now-compressed PEEK powder 25. In practice, these "cakes" typically retain their shape without crumbling.

Once the lower press 26 has ejected the "cakes," they can be placed onto a clean tray. The PEEK powder 25 "cakes" are then placed into a heating device, such as an oven (not shown). The oven can be a conventional batch oven, such as are commercially available from Blue M or Griese. An operator then adjusts the oven (not shown) to heat the PEEK powder 25. For best results, we prefer to heat the PEEK powder 25 at a rate of approximately 75° C. per minute, ±5° C. per minute. The PEEK powder 25 should be heated to approximately 340° C., ±2° C. (i.e., "substantially 340° C."). Through experimentation, we have found that the melting temperature of PEEK varies between 340° C. and 344° C. For example, we have found that a low viscosity grade PEEK (Number Grade 150) has a melting temperature of 340° C., whereas a high viscosity grade PEEK (Number Grade 450) has a melting temperature of 344° C. The specific example described herein is based upon the use of a low viscosity grade PEEK (Number Grade 150), which we found to have a melting temperature of 340° C. For best results, the temperature of the PEEK powder 25 should be held at substantially 340° C. for at least thirty minutes. Maintaining the PEEK powder 25 at this temperature thus sinters the PEEK powder 25 to form filters of the desired shape and filtering characteristics. After the PEEK powder 25 has been held at substantially 340° C. for at least thirty minutes, the now-sintered PEEK powder 25 (now forming a filter 50 as described below) should be removed from the oven (not shown) and allowed to sit in an open area to air cool at room temperature.

Figure 4:
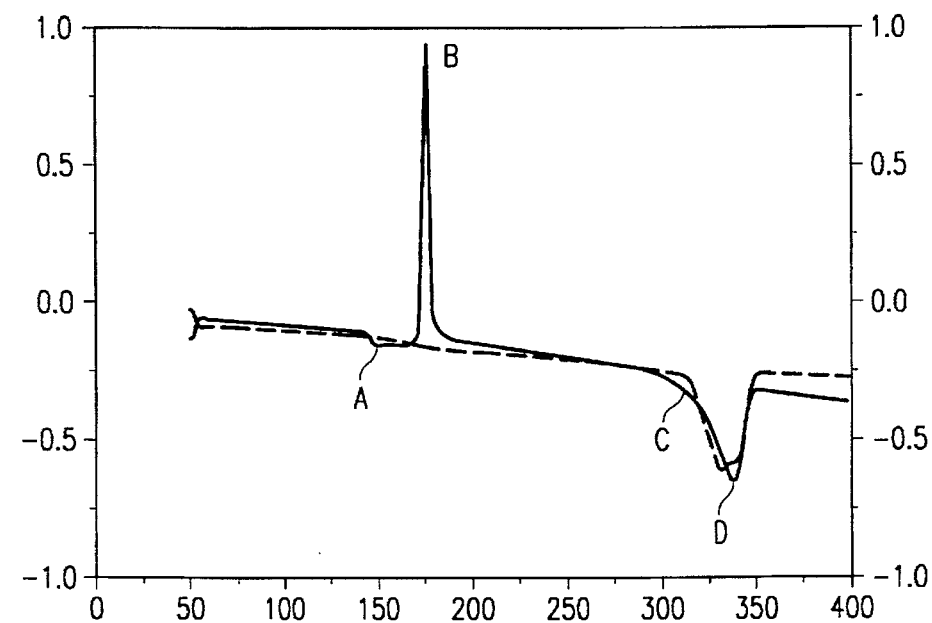
FIG. 4 is a differential scanning calorimeter curve for polyetheretherketone.

FIG. 4 provides a differential scanning calorimeter (DSC) curve of PEEK. Point A on the DSC curve shown in FIG. 4 represents the glass transition temperature of the PEEK sample. Below this temperature, no rearrangement of the PEEK crystalline structure occurs. Above the glass transition temperature, however, the PEEK becomes flexible. As shown in FIG. 4, the glass transition temperature for PEEK is approximately 140° C.

Point B on the DSC curve of FIG. 4 shows where the PEEK becomes semi-amorphous or semi-crystalline. The PEEK remains in this state from Point B until Point C on the DSC curve. At Point C, melting begins. At the temperature reflected at Point C, the individual PEEK particles still have some crystallinity, but the outer surfaces of the PEEK particles have some non-crystallinity. Point D on the DSC curve of the PEEK, which is approximately 345° C., represents the meltig termperature of the PEEK. At the melting temperature (or above), the PEEK becomes completely amorphous.

The DSC curve of FIG. 4 provides guidance in sintering the PEEK powder 25. If the melting temperature (Point D) of PEEK is reached, the individual particles in the PEEK powder 25 will melt, thus ruining the filtering characteristics of any resulting filter 50 (described below). The DSC curve provides guidance for determining a temperature to sinter the PEEK powder 25. A "soak temperature" between Points C and D is needed. A soak temperature in this range allows the PEEK powder 25 to be sintered without completely melting. For best results, we prefer a soak temperature closer to Point D (the melting temperature) without going over the melting temperature. We have found that the ideal temperature range for the soak temperature is from approximately 339° C. to approximately 344° C. It is also important to hold the PEEK powder 25 at the soak temperature for enough time to allow the heat to soak completely through the PEEK powder 25 to ensure sintering throughout the PEEK powder 25. We have found that thirty (30) minutes is an appropriate amount of time to allow sintering throughout the PEEK powder 25. This allows the individual particles in the PEEK powder 25 to bond to one another.

Figure 5:
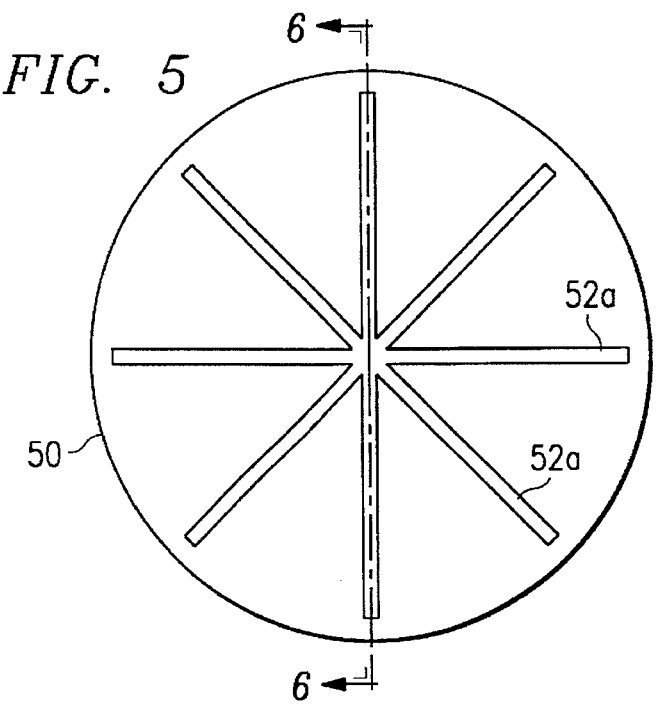
FIG. 5 is a frontal view of a particular type of biocompatible filter made in accordance with the present invention.
Figure 6:
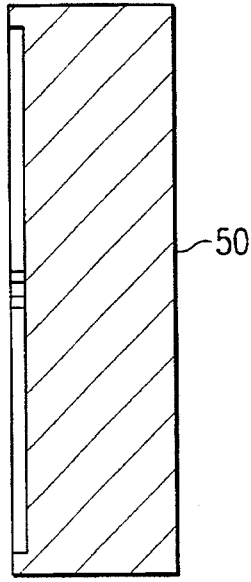
FIG. 6 is a cross-sectional view of the filter along line 5—5.

A filter 50 made in accordance with the foregoing procedure is shown in FIGS. 5 and 6. As shown in FIGS. 5 and 6, the filter 50 is a generally round disk. As shown in FIGS. 5 and 6, the front surface of filter 50 has a plurality of grooves 52a. The grooves 52a are groves in the front surface of the filter 50; the grooves 52a extend in a pattern like spokes from the center of the filter 50. The grooves 52a can be formed by using an upper press 28 with an upper facing section 28a designed to imprint a predetermined pattern (such as grooves 52a) into the top of the PEEK powder 25.

Figure 7:
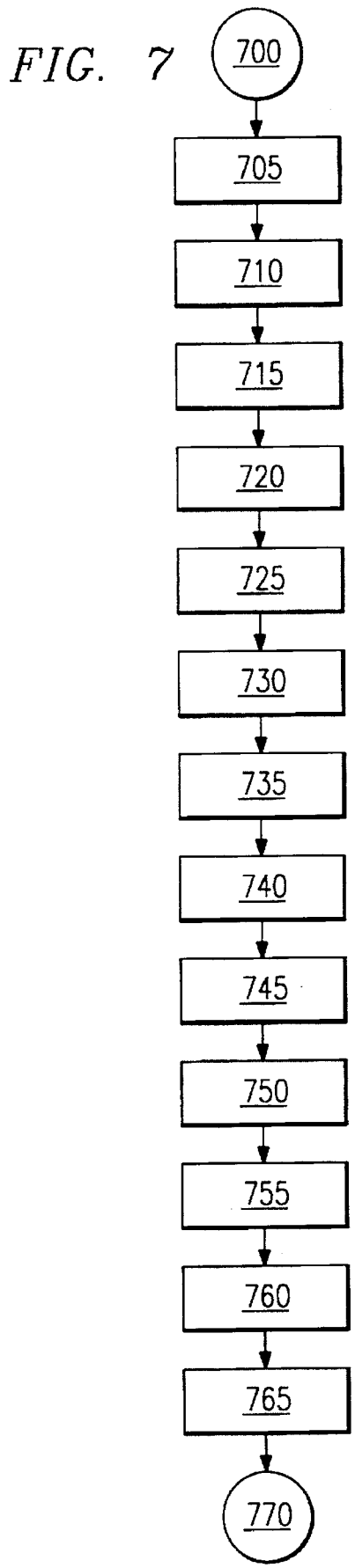
FIG. 7 is a block diagram of the steps of the present invention for making a biocompatible filter of the present invention.

Referring now to FIG. 7, a flow chart of the method of the present invention is shown with respect to the embodiment described above. Circle 700 is simply the starting point at which the biocompatible material to be sintered has been selected and obtained. In the preferred embodiment of the invention, the biocompatible material is PEEK. In block 705, the biocompatible material is ground into a powder.

Next, the powder is sized in block 710. As noted above, the sizing of the powder as indicated by block 710 can be accomplished by using a conventional air classifier (not shown) or by sifting the powder through conventional mesh screens (not shown). Once a powder with particles of a desired average size has been obtained by sizing the powder (block 710), an appropriate amount of the powder is then placed into a conventional die, as indicated by block 715. (As noted above and shown in FIG. 2, the die 20 and the lower press 26 are pre-positioned with respect to each other so that an appropriate "fill height" is provided in the bore 22 of the die 20.)

After the powder is placed in the bore 22 of the die 20, as indicated by block 715, any excess powder is removed from the die, indicated by block 720. The excess powder can be removed by scraping it off the surface of the die 20. In block 725, the die 20 is closed by lowering an upper press 28 (shown in FIG. 3). Once the die 20 has been closed, as indicated by block 725, the upper press 28 extends into the bore 22 of the die 20 (as shown in FIG. 3). In block 730, the upper press 28 presses the powder in the bore 22 of the die 20. During the pressing, the powder forms "cakes" of the pressed powder.

After the powder has been pressed, the die 20 is opened (block 735) by raising the upper press 28. Once the die 20 has been opened, the cake formed by pressing the powder is removed from the die 20, as indicated by block 740. The powder cake is then placed on a tray, which is then placed into an oven, such as a conventional batch oven. Block 745 represents placing the powder cake in the heating means.

In block 750, the cake is then heated to a predetermined temperature. As noted above, we prefer to heat the PEEK powder at a rate of about 75° C. per minute up to a temperature of substantially 340° C. In block 755, the heated powder is maintained at the desired temperature for a desired amount of time. As noted above, we prefer to hold the PEEK powder at a temperature of substantially 340° C. for at least thirty minutes. After that, the powder is removed from the heating means (block 760) and the now-sintered powder cake is cooled at room temperature (block 765). Upon cooling, the resulting frits are then ready for use, as indicated by end point 770 in FIG. 7.

Filters made in accordance with the method of the present invention have been tested to verify average pore size and strength. A conventional "bubble test" of filter 50 made in accordance with the method of the present invention yielded the following:

|  | Frit Size: | |
| --- | --- | --- |
|  | 0.5 μm | 2.0 μm |
| Max. pore size: | 10 μm | 21 μm |
| Effective pore size: | 8 μm | 18 μm |

The fracture strength of a filter made in accordance with the present invention was experimentally determined to be about 90 MPa. (This is in sharp contrast to other, conventional biocompatible filters, which we have found to have a fracture strength of only 14.33 MPa or so). Hence, the method of the present invention can be used to make biocompatible filters with a fairly high fracture strength; i.e., a biocompatible filter which is appropriate for many HPLC applications.

While the present invention has been shown and described in its preferred embodiment and in certain specific alternative embodiments, those skilled in the art will recognize from the foregoing discussion that various changes, modifications, and variations may be made thereto without departing from the spirit and scope of the invention as set forth in the claims. Hence, the embodiment and specific dimensions, materials and the like are merely illustrative and do not limit the scope of the invention or the claims herein.

We claim the following:

1. A method for making a biocompatible filter, comprising in order, the steps of:

sizing a biocompatible powder consisting essentially of particles of a single polymeric material to obtain a desired average particle size;

applying pressure to the biocompatible powder to form an object with a desired shape;

releasing the pressure on the object;

heating the object to a preselected temperature;

maintaining the object at the preselected temperature for a desired time; and cooling the object.

2. The method according to claim 1 wherein the step of sizing a biocompatible powder comprises the steps of:

grinding a biocompatible powder consisting essentially of particles of a single polymeric material; and sifting the powder after grinding in order to obtain a desired average particle size of the powder.

3. The method according to claim 1 wherein the step of pressing the powder comprises the steps of introducing the powder into a bore through a die wherein a lower press extends into a first end of the bore and an upper press is positioned above a second end of the bore, and wherein each of the lower and upper presses have a facing surface; and urging at least one of the facing surfaces towards the other facing surface to press the powder between the facing surfaces of the two presses to form an object with a desired shape.

4. The method according to claim 3 further comprising the steps of:

applying a compaction pressure to the powder for a desired amount of time;

removing at least one of the presses; and removing the pressed powder from the die by pushing it out of the die with one of the presses.

5. The method according to claim 4 further comprising the steps of placing the pressed powder on a tray and placing the tray with the compressed powder thereon into means for heating the pressed powder.

6. The method according to claim 4 wherein the desired shape is a disk.

7. The method according to claim 1 further comprising the step of forming the powder into a desired shape.

8. The method according to claim 1 wherein the biocompatible powder consists essentially of polyetheretherketone.

9. The method according to claim 8 wherein the biocompatible powder is heated to a temperature of substantially 340° C. and the temperature is maintained at substantially 340° C. for at least thirty minutes.

10. The method according to claim 9 further comprising the step of removing the object from the heating means, and wherein the object is air cooled at room temperature.

11. The method according to claim 9 wherein the powder is heated at a rate of about 75° C. per minute.

12. The method according to claim 1 wherein the step of pressing the powder comprises exerting a substantially uniform compaction force on the powder of about 200 MPa.

13. The method according to claim 1 wherein the preselected temperature is sufficiently high to cause the powder's constituent particles to bind to each other.

14. A method for making a biocompatible filter, comprising in order, the steps of:

grinding a biocompatible material consisting essentially of particles of a single polymeric material to obtain a biocompatible powder;

sifting the biocompatible powder to obtain a biocompatible powder with a preselected particle size;

introducing a preselected amount of the biocompatible powder into a die, wherein a lower press having a facing surface extends into a first end of the bore and an upper press having a facing surface is positioned above a second end of the bore;

applying pressure to the powder by urging at least one of the facing surfaces towards the powder and the other facing surface to form an object with a desired shape;

releasing the pressure on the object;

heating the object at a preselected rate to a preselected temperature;

maintaining the object's temperature at the preselected temperature for a desired time;

cooling the object.

15. The method according to claim 14 further comprising the step of allowing the filter to air cool at room temperature.

16. The method according to claim 14 wherein the biocompatible material consists of polyetheretherketone, and wherein the mold is heated to a temperature of substantially 340° C., which temperature is maintained for at least thirty minutes.

17. A method for making a porous biocompatible filter, comprising in order, the steps of:

applying pressure to a biocompatible powder consisting essentially of particles of a single polymeric material of a desired average particle size to form a porous object with a desired shape;

releasing the pressure on the object;

heating the object to a desired temperature;

maintaining the object to a desired temperature for a desired time to cause the object's constituent particles to bind together, yet remain porous; and cooling the object.

18. A method for making a biocompatible filter, comprising in order, the steps of:

applying pressure to a selected amount of a biocompatible powder consisting essentially of particles of a single polymeric material, wherein said particles have a desired average particle size, to form an object with a desired shape;

releasing the pressure on the object;

heating the object to a preselected temperature;

maintaining the object at the preselected temperature for a desired time; and cooling the object.

19. A biocompatible filter consisting essentially of polyetheretherketone made in accordance with the method of claim 8.

* * * * *